Patented Feb. 12, 1935

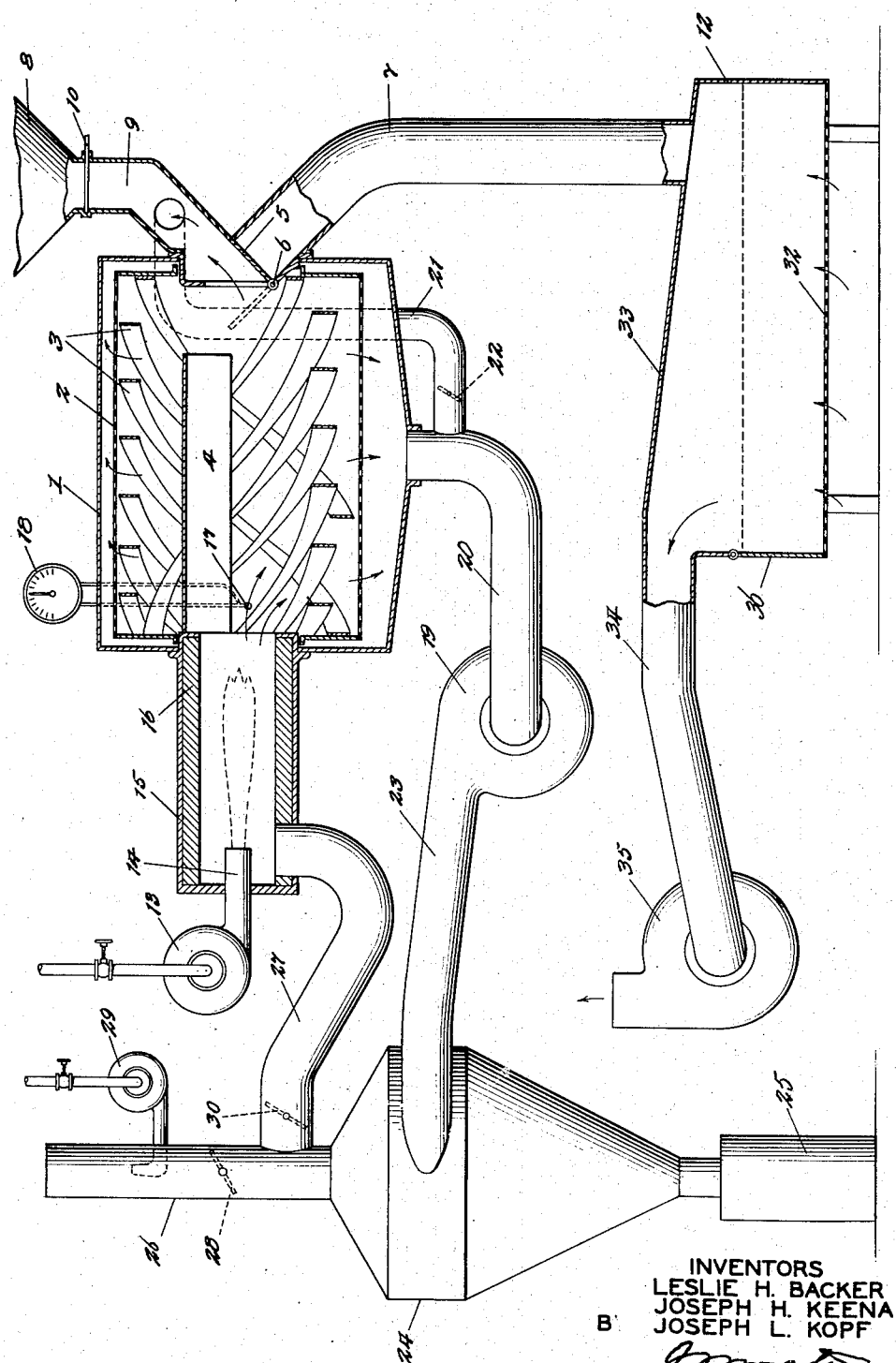

1,991,190

UNITED STATES PATENT OFFICE 1,991,190

ROASTING METHOD

Leslie H. Backer, Summit, Joseph H. Keenan, Hoboken, and Joseph L. Kopf, East Orange, N. J., assignors to Jabez Burns & Sons, Inc., New York, N. Y., a corporation of New York Application March 23, 1933, Serial No. 662,227

3 Claims. (Cl. 34—24)

This invention relates to a novel method and apparatus for roasting coffee, cocoa beans, peanuts, cereals and similar products whereby the finished good are improved in appearance, development and flavor; the risk of scorching or "spotting" is eliminated; and the cost of roasting is reduced.

In existing methods, the roasting period may be shortened by increasing the temperature within the roasting chamber. This is done by increasing the output of the heating element, or by reducing the quantity of goods in each batch with relation to the size of the heating element and roasting chamber. To approach an ideal roasting period, the temperature must be raised to a point where expert manipulation and constant watchfulness are necessary to prevent scorching or "spotting" the product. Also, at such temperatures, particles of chaff and light trash are burned; with the result that charred material and an objectionable quantity of smoke are produced, giving the finished product a lusterless or dirty appearance.

Where the advantages of full and uniform development and the economy of rapid production are considered less important than clean, polished appearance in the roasted product, it is common practice to reduce the roasting temperature by diluting the heating medium with cool air or by cutting down the output of the heating element. Either procedure lengthens the roasting period materially. The former is wasteful of fuel, but has the advantage of carrying off chaff etc. more quickly (by the increased draft) so that the waxy luster is not rubbed off the goods by the milling action of such chaff and trash. One of the advantages of our invention, as explained below, is that this quick removal of chaff is accomplished without waste of fuel.

In the present invention the heater is outside the roasting chamber. The necessary quantity of heat is rapidly transferred to the product by increasing the volume of gaseous heating medium passed through the roasting chamber, instead of increasing the temperature. Thus, in a given time, a greater number of heat units are supplied to the roasting chamber, for any given temperature, than can be supplied by existing methods. This is accomplished by recirculating the heating medium at a regulated velocity sufficient to supply the required quantity of heat at a uniform, safe temperature. At one point in the path of circulation heat is added to the medium to restore that absorbed by the product—and any that may be lost by radiation or otherwise, by passing the recirculated medium through a flame, which also consumes any chaff, combustible vapors or gases or the like, in the medium.

Apparatus for carrying out the invention is diagrammatically illustrated in the accompanying drawing wherein 1 is a roaster casing in which is mounted a rotatable perforated cylinder or carrier 2 adapted to hold the material to be roasted. Cylinder 2 is rotated in any suitable manner.

A plurality of mixing vanes 3 are arranged inside cylinder 2 for the purpose of carrying the material from the bottom to the top and constantly agitating it during roasting. Within the central portion of the cylinder and supported by the rear head of casing 1 is a tent-shaped hood or spreader 4. Vanes 3 lift the material to be roasted and drop it on hood 4.

Swing gate 5 is pivoted at 6 to the front head of the roaster. When this gate is swung forward, as shown in the drawing, it covers discharge chute 7 and permits raw material to be fed from hopper 8 through feed pipe 9 into cylinder 2, the flow of material being controlled by feed gate 10. When gate 5 is swung back to the position shown in dotted lines it acts as an outlet directing the roasted material through discharge chute 7 into cooler box 12 for rapid cooling as hereinafter described.

The heating and smoke consuming flame may be provided by a burner of any suitable type such as a motor-driven blower 13 arranged to mechanically premix gas with the proper volume of air for most efficient combustion and discharge the mixture through nozzle 14 disposed in heating chamber 15. See Maxon Patent 1,291,589, January 14, 1919, which discloses and claims such method of burning gas. The heating chamber preferably has an inner lining 16 of fire clay or other refractory or heat resisting material and opens into the rear end of cylinder 2 beneath hood 4. Nozzle 14 directs an elongated flame centrally of chamber 15 and wholly outside cylinder 2. Thermo-couple 17 is mounted beneath hood 4 adjacent heating chamber 15 and is connected to dial 18 for the purpose of indicating the temperature of the heating medium as it enters the roasting cylinder.

Exhaust fan 19 is connected to the roaster casing 1 by suction pipe 20. 21 is a branch suction pipe containing damper 22, and is connected to feed pipe 9. Outlet pipe 23 from fan 19 is connected to separator 24 of any suitable type for removing chaff and light trash which drop into receptacle 25. The top of separator 24 opens into a discharge or bleeder pipe 26, which leads to the atmosphere, and into return pipe 27 which is connected to heating chamber 15 adjacent burner nozzle 14. Bleeder pipe 26 contains bleeder damper 28 and smoke burner 29 which may be similar to main burner 13. Return pipe 27 contains damper 30 which controls the flow of gases returning to heating chamber 15.

In operation, a quantity of raw material is fed into the revolving cylinder 2, and the feed gate 10 is then closed. Fan 19 is started, setting up a circulation of the heating medium through the several chambers and pipes of the closed system; and the dampers which control the circulation and the exhaust of excess gases are set as hereinafter explained. The heating element is turned on and regulated, to supply heat at the rate which will complete the roast in a predetermined length of time.

The gaseous medium passes from heating chamber 15 into the central portion of the roasting cylinder under the hood and thence outward, through the surrounding wall of material and the perforated shell. A large proportion of its heat is absorbed in passing through the material in the roasting cylinder, hence the gases are returned to heating chamber 15 at considerably lower temperature, passing through pipe 20, fan 19, pipe 23, collector 24 and pipe 27. Chaff and light trash are drawn out through the cylinder perforations, and at the front head by branch suction pipe 21 and are separated in collector 24.

Since heat is liberated in the flame at a constant rate, the temperature in the roasting cylinder may be lowered by increasing the flow of cooler returning gases passed through the heating chamber; and the temperature may be raised by decreasing the flow. Recirculating damper 30 should therefore be set to regulate the flow of returning gas in such a way that the highest temperature of the roasting cycle (at the end of the roast) will be below the point at which the goods scorch or the chaff burns. This damper setting and other control adjustments are determined by reference to temperature indicator 18 during a trial roast.

The fan and duct system are so designed that a temperature range of 600 to 800 degrees can be maintained in the roasting cylinder. If the pressure in the roasting cylinder is held approximately at atmospheric pressure, the rate of gas flow in the recirculating ducts can be controlled by adjusting the bleeder damper 28 to give the desired temperature in the roasting cylinder. Partially closing the bleeder damper raises the pressure preceding the damper. This rise in pressure will in turn increase the flow through the recirculating duct to the heating tube, thereby reducing the temperature of the gases entering the roasting cylinder. Opening the bleeder damper, on the other hand, will increase the temperature of the gases entering the roasting cylinder.

If a combustion heating element is employed, the products of combustion ($CO_2$ and water vapor) are continuously added to the heating medium. As the roast progresses there is also added a large volume of gases (chiefly $CO_2$ and water) given off by the product itself. These gases rapidly dilute the original air constituting the heating medium so that the proportion of oxygen becomes very small and the nitrogen content is reduced. The increase of $CO_2$ and water vapor is advantageous because the former contributes to heat transfer to the coffee by its greater capacity for radiation as a dark body, and the latter by its slight reduction in fan power. However, the increase in the total volume of the heating medium must be corrected by discharging the excess.

In order to make it possible to supply a constant air flow to the flame with the simplest type of blower, it is desirable to maintain approximately atmospheric pressure in any roaster cylinder which is being supplied with heat from the combustion of a fuel. The evolution of gases from the coffee in the course of the roast will result in a pressure rise within the cylinder unless adjustment is made of the bleeder damper, 28, the recirculating damper, 30, or both. By adjusting both dampers during the roast the temperature of the heating medium entering the roasting cylinder can be kept constant while maintaining the cylinder pressure at atmospheric pressure. However, more recirculation and lower temperature heating medium can be attained in the early part of the roast by keeping the recirculating damper wide open throughout, adjusting only the bleeder damper to maintain atmospheric pressure in the cylinder. When this method is used the temperature of the heating medium is lowest at the beginning of the roast and gradually rises as the roast proceeds until at the end of the roast it reaches as a maximum the value that could have been maintained constant throughout by the adjustment of both dampers.

With coffee and some similar products smoke is given off just before the end of the roast. By our method of recirculation this smoke is quickly carried off by the gases and does not return to soil the goods. The greater part is burned in heating chamber 15 and the remainder is discharged through bleeder 26 and consumed by smoke burner 29.

If a temperature of about 800° is to be maintained at the exit of the combustion tube about four times as much gases must be returned to the combustion tube by the recirculating system as the products of combustion from the flame. This means that about five times the amount of products of combustion from the flame is passing as heating gas through the roasting material and carrying off the products of roasting and the smoke. Of this amount only an amount equal to the products of combustion from the flame and the products of roasting pass out the stack to the atmosphere carrying with it only its share of the smoke from the roaster. The remainder of the smoke, which in the existing type of roasters would all pass to the atmosphere, in this device is returned to the burner and burned as it passes through the combustion tube.

The process is continued, as above described, until the product is roasted to the desired color. It is then discharged through swing gate 5 and chute 7 into cooler box 12 which may be of any suitable construction, preferably having a perforated bottom wall 32. In the form shown, cooler box 12 has a hood 33 and a pipe 34 connected to suction fan 35 which draws air upward through bottom wall 32 and cools the product quickly. The product can be discharged from the cooler through a door 36.

Satisfactory results are obtained in roasting coffee by providing sufficient recirculation to result in a heating medium temperature starting at 600° F. and increasing to 800° F. at the end of the roast. This entire range of temperature is well below the temperature (about 950° F.) at which scorching will occur. The temperature of the gases leaving the roasting cylinder and passing to the bleeder pipe or to the recirculating line is about the same as the coffee temperature and averages a little less than 300° F. for the entire process. The pressure drop experienced by the gases on flowing through the coffee, and the roasting cylinder perforations is about 2 inches of water.

As soon as the roasted material is discharged from the roasting cylinder another cycle is commenced with a new batch of raw material. It will be evident that the damper regulation may be made by any suitable automatic means, actuated by the temperature indicator, if desired.

From the foregoing, it is evident that the following improvements in the art of roasting coffee and similar products are effected by our method:

Rapid roasting at low temperature—resulting in full and uniform roasting of each kernel from center to surface; handsome, showy development; clean appearance and high luster; safety to the product; improved flavor; and increased hourly production.

A safe and approximately uniform temperature over the whole area in which the heating medium impinges on the product. This condition permits uniform roasting and accurate temperature control.

Elimination of smoke in recirculated heating medium—improving the appearance of the goods.

Reduction in the quantity of smoke discharged to the atmosphere—avoiding complaints from occupants of the same or neighboring properties.

A more efficient heating medium is secured by reducing the oxygen content and increasing the proportion of $CO_2$ and water vapor—as compared with methods using excess air to secure a polished roast.

Fuel efficiency is greatly increased by reducing stack losses,—recirculation obviates the necessity for great quantities of excess air as used in the conventional roaster to prevent gas temperatures reaching the scorching or spotting point.

Less expensive labor, and less total labor, are required. With existing processes, constant watchfulness, experience and a high order of skill are necessary to secure correct development and to match successive roasts without spotting the product. In our process, special skill is not required of the operator, and less attention is demanded during the roasting period. The improvement in this respect is so marked that the whole operation may safely be made automatic by direct control from the thermo-couple.

While we have not shown the details, it is to be understood that fans 13, 29 and 19 may have variable speed control; and the source of heat energy such as gas, oil, electricity, may also be regulated, by means well understood in the art and unnecessary to be shown for a full understanding of this invention.

It will also be evident that various changes may be made in the details of construction and method of operation herein described without departing from the scope and spirit of the invention as defined by the appended claims.

The invention claimed is:

1. A method of roasting coffee, cocoa beans, peanuts, and similar edible bean-like materials which comprises passing gases in contact with a flame, passing such heated gases through the material to be roasted, withdrawing the gases from said material, repassing said gases to said flame to reheat said gases and free them from smoke by burning smoke particles, and recirculating said reheated and purified gases through said material.

2. A method of roasting coffee, cocoa beans, peanuts, and similar edible bean-like materials by heating gases in a flame, continuously circulating said heated gases through the material, bleeding from the circuit excess gases liberated by the material, and burning up combustible gases and vapors mixed with the remaining heated gases by recirculating through the flame.

3. A method of roasting coffee, cocoa beans, peanuts and similar edible bean-like materials in which a gas stream is circulated through a flame in which it is freed from combustible gases and vapors by burning the same, then through the roasting chamber in which it heats the material by passing over and through it, the temperature of the gas stream as it passes into the roasting chamber being less than the temperature at which the material or its chaff will scorch, then through a device which cleans it of chaff and trash, then into a divided passage one branch of which leads a major part of the stream back to the heating chamber where it begins a recirculation through the entire system, the other branch of which leads a minor part of the stream to the atmosphere.

LESLIE H. BACKER.
JOSEPH H. KEENAN.
JOSEPH L. KOPF.